United States Patent [19]
Barr

[11] 3,993,463
[45] Nov. 23, 1976

[54] PARTICLE SEPARATOR FOR TURBINE ENGINES OF AIRCRAFT

[75] Inventor: Samuel R. Barr, Swampscott, Mass.

[73] Assignee: The United States of America as represented by the Secretary of the Army, Alexandria, Va.

[22] Filed: Aug. 28, 1975

[21] Appl. No.: 608,484

[52] U.S. Cl. ................................ 55/306; 55/452; 55/461; 60/39.09 P; 244/53 B; 415/121 G
[51] Int. Cl.² ........................................... B01D 39/00
[58] Field of Search ............ 55/306, 391, 447, 449, 55/452, 456, 458, 459, 461; 60/39.09 P; 244/53 B; 415/120 G

[56] References Cited
UNITED STATES PATENTS

| | | | |
|---|---|---|---|
| 1,620,241 | 3/1927 | Stebbins | 209/144 |
| 1,866,196 | 7/1932 | Criqui et al. | 55/235 |
| 2,194,361 | 3/1940 | Linder | 55/461 |
| 3,832,086 | 8/1974 | Hull et al. | 55/306 |
| 3,923,481 | 12/1975 | Farrow | 55/459 C |
| 7,631,199 | 6/1904 | Newton et al. | 55/452 |

Primary Examiner—Bernard Nozick
Attorney, Agent, or Firm—Nathan Edelberg; Norman L. Wilson, Jr.

[57] ABSTRACT

Sand and dust erosion of turbine engines by ingested particulate matter is a major problem facing both airframe and engine manufacturers. Various types of particle separators are used to keep sand and dust out of the engine. In these separators the particles are diverted by swirl vanes and similar devices to keep them out of the engine. An inlet scroll separator herein permits the particles to continue their course of travel and diverts the air stream, reducing power requirements and eliminating swirl and deswirl vanes.

5 Claims, 7 Drawing Figures

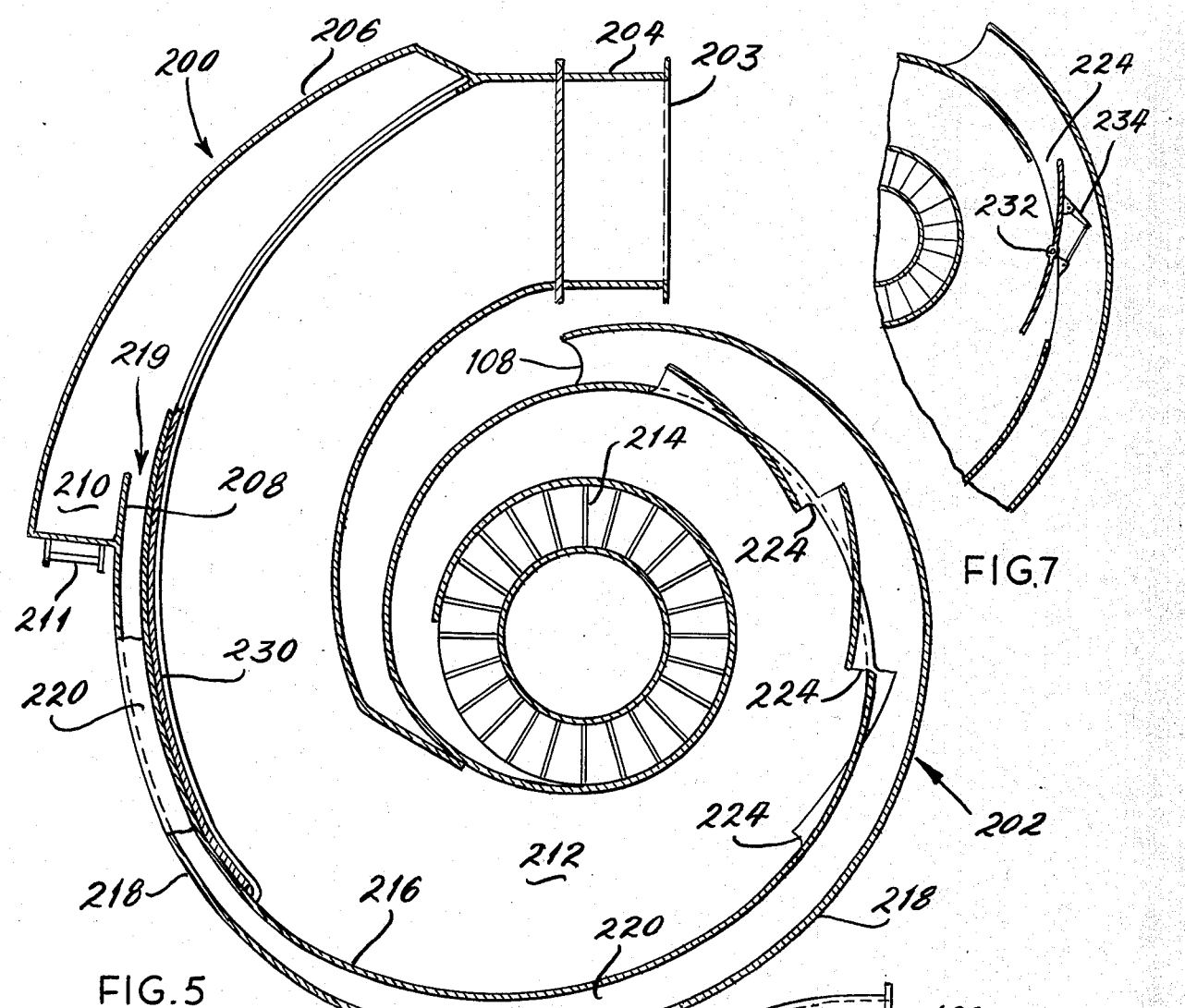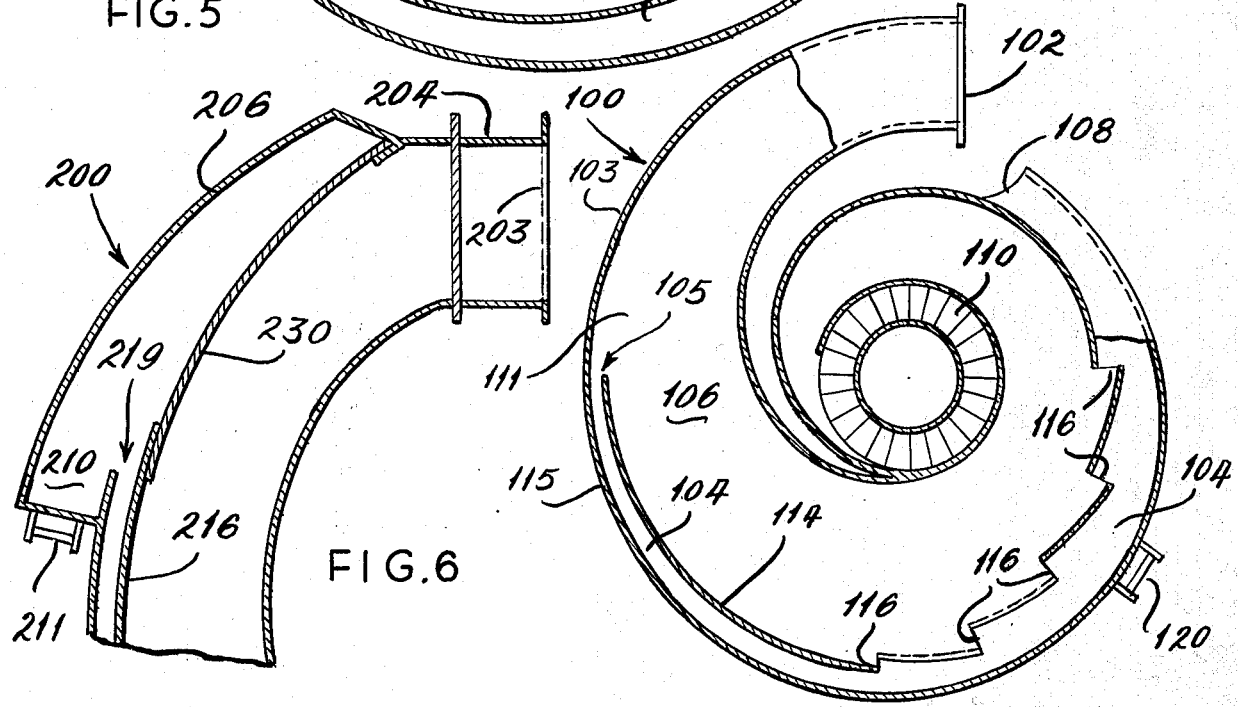

PARTICLE SEPARATOR FOR TURBINE ENGINES OF AIRCRAFT

BACKGROUND OF THE INVENTION

This invention relates to inertial-type engine air particle separators for turbine engines, particularly turbine engines for aircraft.

Over the past decade the Army has lost millions of dollars as a result of foreign object damage to turbine engines. In fact sand and dust erosion is one of the major problems facing Army aviation and other users of gas turbine engines. The best known example of damage is erosion of both leading and trailing edges of compressor blades due to sand and dust ingestion. In addition since particles traveling from stage to stage are centrifuged outwardly, they also erode the compressor housing and stator vanes. Compressor erosion has presented a problem to both airframe and engine manufacturers.

The need to protect turboshaft engines from foreign object ingestion became especially apparent in Southeast Asia. Virtually all military helicopters had to be provided with engine air particle separators.

The high demand for engine erosion prevention has led to the development of four types of particle separators: barrier filters, single tube inertial separators, multi-tube inertial separators and two stage separators utilizing combinations of inertial separators.

Filters have been used on several helicopter models. However, high maintenance requirements, and the high pressure drops when filters are loaded with sand are disadvantageous. In addition failures result from filters becoming clogged or collapsed.

Inertial-type particle separators are generally categorized according to flow. Flow paths in these separators are either axial or radial. Such separators are shown in FIGS. 1 and 2. One type of axial flow separator consists of an array of small vortex tubes, such as that shown in FIG. 1, mounted in parallel in a tube sheet 2. Dirt particles in the air are swirled to the outer walls 4 of a vortex tube by vortex generator 6. Scavenge air carrying the contaminants flows out passageway 8 and the clean air enters the engine through outlet tube 10. Such tubes are generally about 1 ½ inches in diameter and two to four inches long.

The particle separator shown in FIG. 2 is also an axial flow device, consisting of an inner annulus 12, a stage of swirl vanes 14, a stage of scroll vanes 16, a collection or scavenge scroll 18 and a stage of exit deswirl vanes 17 which are in front of the engine compressor inlet. Inlet swirl vanes 14 impart a rotational velocity to the inflowing air, thereby generating a vortex flow field. Owing to their greater inertia, foreign particles caught within this flow field are centrifuged to the outer wall 19 of the separator. These particles are then drawn into the scavenge scroll 18 and finally bled off through a scavenge outlet along with a small percentage of excess air. The remaining air passes through the exit deswirl, or straightening, vanes 17 which remove any residual swirl at the exit of the separator to deliver clean, undistorted air to the engine compressor. An auxiliary fan can be used to supply a scavenge suction source, an alternate but less efficient scavenge suction source being an ejector system.

A combination particle separator is shown in FIG. 3. Such powered centrifuged separators are deemed to meet future fine particle performance requirements. Such a powered separator, typically utilizing a centrifugal impeller or a rotating member 20, can centrifuge particles to the periphery of the flow field by imparting a whirl component to the air flow which in turn imparts this motion to the particles. Because the centrifugal force on a rotating particle increases with the distance of the particle from the center of rotation, it is advisable that the fine-particle-laden airstream enter a powered centrifugal separator around a center body 22 so that particles are already well out on a radius as they enter. The center body 22 is employed as a conventional inertial separator, as shown in FIG. 3 affording a further advantage.

There is provided herein a scroll or radial separator having no swirl vanes, no scroll scavenge vanes, no deswirl vanes and the air intake can be readily adopted for the introduction of air from any direction. All incoming air to the engine must pass through the scroll separator before it can enter the engine. Since great flexibility of design is possible the separator is adoptable to a variety different installation configurations.

SUMMARY OF THE INVENTION

The inertial particle separator contemplated herein is a radial flow device of the scroll type. The separator is in the form of a helicoidal duct having an inner wall means therewithin. The inner wall is spaced inwardly from the duct outer wall and involuted therewith to form an inner engine air flow passageway and an outer scavenge exhaust duct. Means are provided for admitting to this exhaust duct scavenge air centrifuged along the outside circumference of inner air flow passageway. Also provided are scavenge air exhaust means for the expulsion of scavenge air and foreign particles therein. In a preferred embodiment an inflow particle segregation means anteriorly of the helicoidal duct is employed.

DETAILED DESCRIPTION OF THE INVENTION

The basic principle of a scroll separator is that foreign particles do not change direction as readily as does the air transporting them. In known devices swirl vanes and the like divert the foreign particles contained in the inflowing air stream. In the separator herein most the inertial action is produced by diverting the air rather than diverting the particles, which tend to continue to move in a straight line to removal means. By this invention therefore the quantity of exhaust air needed to carry off the particulate matter is greatly reduced. The means by which this is accomplished will be better understood by reference to the accompanying drawings.

FIG. 4 is a cross sectional view of a separator of the invention.

FIG. 5 is a cross sectional view of a different and preferred separator of the invention.

FIGS. 6 and 7 are partial views of different aspects of the invention.

Figure 1:
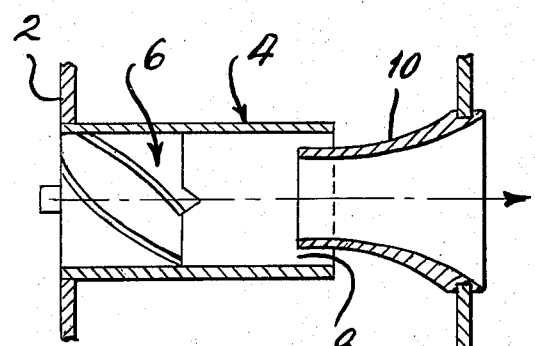
FIGS. 1, 2 and 3 are diagrammatic views of prior art devices as indicated hereinbefore.
Figure 2:
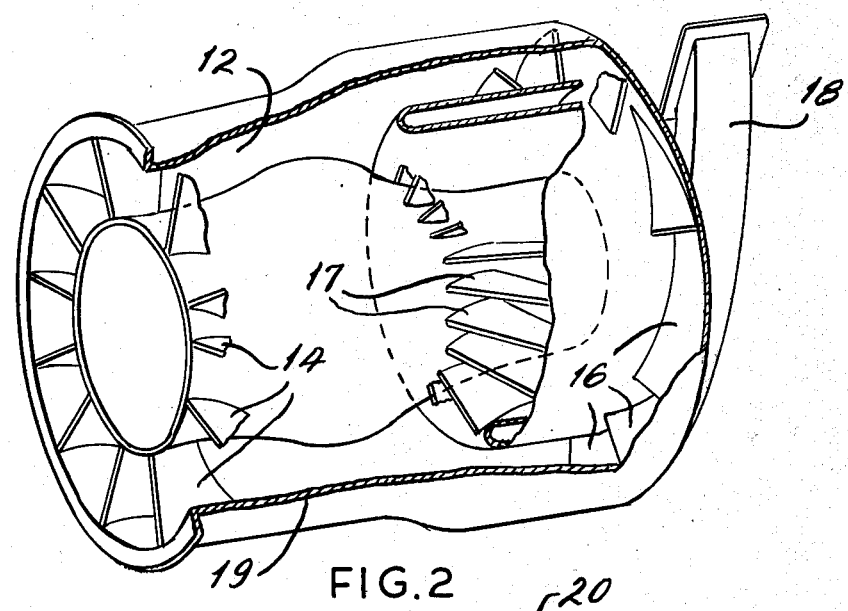
Figure 3:
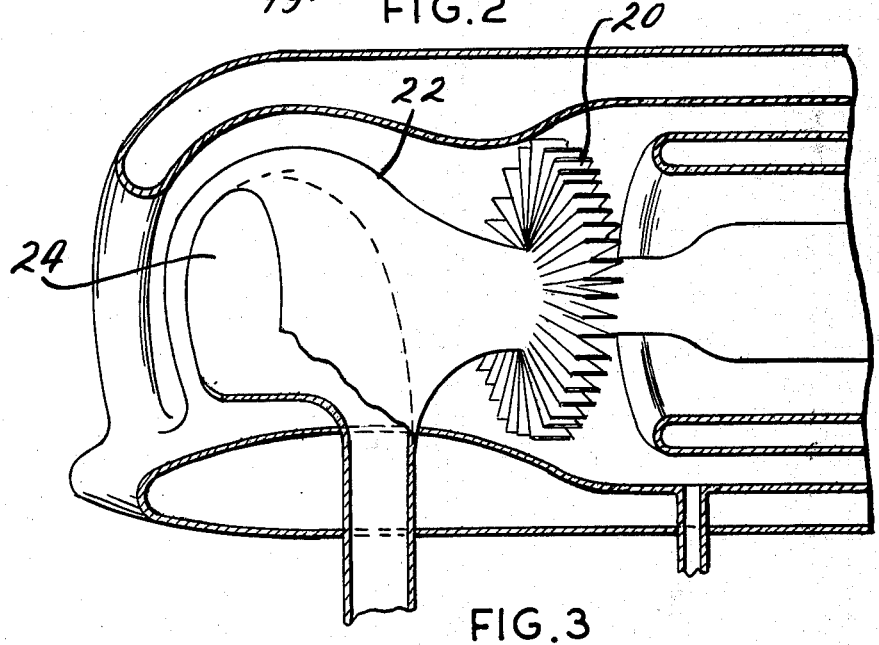

Referring first to FIG. 4, a dust particle separator 100 can be seen having an air inlet 102 shown as a tubular opening, which by means of an elbow 103 is adapted as a tangential inlet. Two flow passageways or ducts 104 and 106 are provided within the separator. Flow passageway 104 is the scavenge airflow duct. The air stream therein is exhausted outside the engine at 108. Flow passageway 106 is the main airflow stream duct, leading directly to the engine inlet 110. This passageway is sized to carry the engine airflow while scavenge passageway 104 is sized to carry only scavenge airflow which is normally about 15 to 20% of engine airflow. Flow passageway 106 is along the inside of the scroll while passageway 104 is along the outer periphery of the scroll. Inner wall 114 separates the two passageways and is provided with openings 116 so that any fine particles (sand, dust, etc.) in the air within passageway 106 will be centrifuged against the inner wall and transferred into passageway 104 through the openings 116 in wall 114.

Considering now the operation, dust-carrying air, passing through the elbow 103, enters inlet tube 111 which is in the form of a helicoidal duct. As seen in FIG. 4, the duct is involuted to form the air flow passageway 106 which terminates in an air outlet 110 at the turbine engine. Within the flow passageway is an inner wall 114 forming a flow channel 104 therebetween. Flow channel 104, in effect, accommodates the scavenge air. Inner wall 114 is provided with air inlet openings or louvers 116 and the end of the flow channel has an exhaust outlet 108. In addition, flow channel 104 can be fitted with clean out ports 120 if desired.

The intake air is thus split into two streams at the wall 114. Air with entrained dirt particles enters scavenge passageway 104 through small opening 105. The major portion of the inlet airflow to the engine forms the second stream flowing into passageway 106 which ultimately terminates at air inlet 110 to the turbine engine. Small particles in passageway 106 are continuously extracted through openings or louvers 116 in wall 114 to provide maximum removal of particles from the engine core air. It is preferred that the cross sectional flow area of the scavenge duct 104 progressively increase as airflow therethrough transitions from the inlet 105 to the scavenge duct exhaust 108. It is also preferred that the openings 116 extend the full width of the scavenge duct 116 in order to provide a relatively large opening for receipt of centrifuged particles. All intake air to the separator (both scavenge and main air streams) flow through the scroll for a distance sufficient for most of the fine sand and dust particles to gather along the outer duct wall. The gas should pass through at least $\pi/2$ radians, preferably through $\pi$ radians before encountering ports 116 in inner wall 114.

As indicated hereinbefore in a preferred aspect of this invention inflow particle segregation means are provided anteriorly of the helicoidal duct. This embodiment of the invention is described in conjunction with FIG. 5. The separator includes a collection or plenum chamber for the separation of larger particles, formed by a baffle in the inflow section. If desired the baffle can be perforated to reduce turbulence. In addition, the segregation means is in communication with the outer scavenge exhaust duct previously described. This will be understood by reference to FIG. 5

In actuality two inertial particle separators 200 and 202 in series are provided. The first inertial separator 200 includes an air inflow pipe 203 preferably having a straight inlet section 204 and an arcuate section 206 effecting an initial centrifugal gradient of particulate matter in the inlet air. Alternatively, it is also possible to utilize a fully arcuate inlet as shown in FIG. 4. Baffle means 208 within the arcuate section forms a collecting chamber 210 for larger particles. Particle removal means 211 are included within said collecting chamber. The second inertial separator includes a helicoidal duct forming the airflow passageway to the engine 214. Inner wall means 216 within the helicoidal duct, are spaced inwardly from the duct outer wall 218 and involuted therewith to form outer duct 220 and inner ducts 212. Outer duct 220 is a scavenge exhaust duct for the first inertial separator 200. The scavenge exhaust duct inlet is shown at 219. Inner duct 212 is the second inertial separator. Means 224 are provided for admitting to said scavenge exhaust duct particles centrifuged to the outside circumference of second inertial separator 202. Means connect the inner second inertial separator air duct to engine air inlet 214. In addition exhaust means are used for the expulsion of scavenge air through scavenge exhaust duct 220. By air pressure, using a blower if necessary, small particles are continuously extracted through the exhaust system, ports 224 promoting this extraction by functioning as scoops.

It can be seen that air entering the first or inflow particle segregation chamber 210 is exhausted directly into scavenge passageway inlet 219. If desired baffle 208 can be perforated to mitigate turbulence in the inflow segregation chamber. The advantage of incorporating the first segregation or plenum chamber is to reduce the number of scavenge ports or louvers 224 over those required in the embodiment of FIG. 4, so as to minimize any turbulent effects and to lessen pressure losses at localized ports because of this reduced number of ports. The embodiment of FIG. 5 also provides for the removal of larger particles from the intake air initially so that the openings of ports 224 in the second segregation chamber can be smaller. It is quite impossible for these large objects to be retained in the main air duct. The two flow path scroll separator of this invention thus affords advantages in both function and design over prior art particle separators.

As indicated the particle separator provided herein is much less complex mechanically than prior art devices. Yet it provides an engine air stream through its outlet as free of particulate matter as any of the known separators. There is no need for swirl and deswirl vanes and anti-icing is simplified. In addition aircraft installation is simpler and more flexible. In fact because of its facile structure the particle separator of the invention lends itself to a variety of modifications in construction and installation. Two such variations are shown in FIGS. 6 and 7. It is preferred that the anterior or inflow particle segregator be closed off during flight when particle ingestion does not occur. For this reason coverplate 230 is provided. In its open position, this coverplate is seen in FIG. 5. During nonseparator operation coverplate 230 will be closed as shown in FIG. 6, providing another means of improving engine performance. It is noted that the scavenge exhaust entrance 219, and any blower if used, are shut off at this time, reducing the engine load requirement.

It is also advantageous, for the same reason, to close the scavenge exhaust ports, i.e. 116 or 224. These openings can also be provided with cover plates. A preferred closure means is shown in FIG. 7. The louvers of exhaust ports 224 can be provided with hinges 232 and mechanical closure means 224 to close the louvers at altitudes where the separator is not needed. Electrical and mechanical closure means will also occur to those skilled in the art. In another embodiment the separator can be integral with and surrounded by the aircraft oil tank. An integral oil tank built around the separator minimizes space waste. It may also be desirable to widen the section of the scavenge exhaust duct opposite the bleed-off openings. As shown in FIG. 4 exhaust duct 104 is wider at its section opposite ports 116 than at its entrance 105. In addition both axial and tangential scroll separators are possible within the teachings of this invention. Both scroll configurations are very similar except for the type inlet, and slight modifications of the anterior separator. And the anterior particle segregator changes can be minimized if the helicoid is not in a plane but drawn out slightly in screw-thread fashion. By use of a rotatable elbow, or a rotatable anterior separator, the separator can handle air from almost any direction. Such modifications are deemed to be within the scope of this invention.

What is claimed is:

1. In a gas turbine engine particle separator of the scroll type, in combination, a first inertial particle separator for coarse particle removal, and a second inertial particle separator in series therewith for the removal of fine particles, the first inertial separator comprising an air inflow pipe,
a curved section to said pipe adapted to effect an initial centrifugal gradient of particulate matter in inlet air, and
a collection chamber disposed on the outside of the curved section of said inflow pipe to trap coarse particles centrifuged therein,
particle removal means within said collecting chamber, the second inertial separator comprising a helicoidal duct adapted to form an air flow passageway to the engine, means connecting said duct to the air inflow pipe, inner wall means within the duct spaced inwardly from the duct outer wall and involuted therewith to form a curved outer scavenge exhaust duct and an inner separator helicoidal air duct,
a plurality of discharge openings in said inner wall adapted to admit to said scavenge exhaust duct particles centrifuged to the outside circumference of the inner separator air duct,
means whereby the scavenge exhaust duct communicates with the collecting chamber of the first inertial separator to carry particles from both separators, means whereby the inner air duct communicates with the engine air inlet to carry clean air to the engine, and exhaust means for the scavenge exhaust duct.

2. The particle separator of claim 1 wherein closure means are provided to close off the first inertial separator, inlet air flowing directly into the second separator.

3. The particle separator of claim 1 wherein the air inflow pipe includes a straight inlet section ahead of the arcuate section, 4. The particle separator of claim 1 wherein closure means are provided for the discharge openings.

5. The particle separator of claim 1 wherein the scavenge exhaust duct is provided with a widened section opposite the discharge openings.

* * * * *